US 009940901B2

(12) United States Patent
Luebke et al.

(10) Patent No.: US 9,940,901 B2
(45) Date of Patent: Apr. 10, 2018

(54) SEE-THROUGH OPTICAL IMAGE PROCESSING (71) Applicant: NVIDIA Corporation, Santa Clara, CA (US)

(72) Inventors: David Patrick Luebke, Charlottesville, VA (US); Douglas Lanman, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/969,202

(22) Filed: Aug. 16, 2013

(65) Prior Publication Data

US 2014/0085282 A1 Mar. 27, 2014

Related U.S. Application Data (60) Provisional application No. 61/704,429, filed on Sep. 21, 2012.

(51) Int. Cl.
G09G 5/10 (2006.01)
G06F 3/147 (2006.01)
G02B 27/01 (2006.01)
G02B 3/00 (2006.01)

(52) U.S. Cl.
CPC .............. G09G 5/10 (2013.01); G02B 27/017 (2013.01); G06F 3/147 (2013.01); G02B 3/0006 (2013.01); G02B 2027/014 (2013.01); G02B 2027/0118 (2013.01); G02B 2027/0138 (2013.01); G02B 2027/0178 (2013.01); G02B 2027/0187 (2013.01); G09G 2354/00 (2013.01)

(58) Field of Classification Search
CPC .............. G02B 27/017; G02B 27/0172; G02B 27/0178; G02B 27/014; G02B 27/0093; G02B 27/0101; G02B 27/01; G02B 27/104; G02B 27/145; G02B 27/28; G02B 2027/0138; G02B 2027/0118; G02B 2027/0123; G02B 2027/011; G02B 2027/0134; G06F 3/011; G06F 3/013; G06F 3/012; G09G 3/003; H04N 13/0484
See application file for complete search history.

(56) References Cited

U.S. PATENT DOCUMENTS 5,572,343 A * 11/1996 Okamura ............. G02B 27/017
345/8
7,042,610 B1 * 5/2006 Berman .................... G02B 5/00
359/226.1

(Continued)

OTHER PUBLICATIONS

Variable Optical Attenuator Based on Polymer Stabilized Twisted Nematic Liquid Crystal; Opt. Express 12, 1221-1227: Authors: Yan-qing Lu, Fang Du, Yi-Hsin Lin, and Shin-Tson Wu; Published Apr. 5, 2004.*

*Primary Examiner* — Nalini Mummalaneni (57) ABSTRACT

Systems and methods for performing optical image processing via a transparent display are disclosed. In one example approach, a method comprises determining a position of incident light on a see-through display device, determining a direction of the incident light relative to the see-through display device, and modulating, with the see-through display device, a transmission of the incident light through the see-through display device based on the determined position and determined direction of the incident light.

22 Claims, 5 Drawing Sheets (56) References Cited

U.S. PATENT DOCUMENTS

| | | | |
|---|---|---|---|
| 7,639,208 B1* | 12/2009 | Ha | G02B 27/0172 345/204 |
| 2002/0001128 A1* | 1/2002 | Moseley | G02B 5/3016 359/465 |
| 2002/0177481 A1* | 11/2002 | Kitsutaka | 463/30 |
| 2004/0233498 A1* | 11/2004 | Starkweather | G02B 6/353 359/230 |
| 2008/0018555 A1* | 1/2008 | Kuo et al. | 345/8 |
| 2009/0097092 A1* | 4/2009 | Luebke | G02B 27/225 359/237 |
| 2013/0278631 A1* | 10/2013 | Border et al. | 345/633 |
| 2013/0300911 A1* | 11/2013 | Beckman | 348/335 |

* cited by examiner

SEE-THROUGH OPTICAL IMAGE PROCESSING

CROSS REFERENCE TO RELATED APPLICATION

The present application claims the benefit of and priority to U.S. Provisional Patent Application No. 61/704,429, filed Sep. 21, 2012, the entire contents of which is incorporated herein by reference for all purposes.

BACKGROUND

The human visual system (HVS) is a remarkable optical device possessing tremendous resolving ability, dynamic range, and adaptivity. The HVS also performs an impressive amount of processing in early (preattentive) stages to identify salient features and objects. However, the HVS also has some properties that limit its performance under certain conditions. For example, veiling glare due to extremely high contrast can dangerously limit object detection in situations such as driving at night or driving into direct sunlight. On the other hand, conditions such as fog or haze can reduce contrast to a point that significantly limits visibility. The tristimulus nature of human color perception also limits our ability to resolve spectral distributions, so that quite different spectra may be perceived as the same color (metamers). Any form of color blindness exacerbates the problem.

Approaches have been proposed to enhance the power of the human visual system by applying on-the-fly optical image processing using see-through optical processing for image enhancement via a transparent display that modulates the color and intensity of a real-world observation. In contrast to 'see-through' augmented reality (AR) displays, such approaches spatially filter incoming light at an observer's position, so that image processing operations such as contrast reduction, contrast enhancement, or color manipulation may be achieved with reduced latency compared to video-based AR systems. For example, such approaches may use a spatial light modulator (such as a transparent LCD panel) in the optical path to perform a variety of useful image processing operations directly on the light entering the human eye to locally filter a real-world scene to enhance the visual performance of a human observer.

However, the inventors herein have recognized that such approaches may be limited by the optics of near-eye displays. For example, processing pixels on a see-through display device near an eye of a user may cause a shape formed by the processed pixels to be out of focus so that the ability of the system to perform high-resolution image processing is degraded. Further, previous approaches may rely on optical elements to focus the incoming light field to achieve these high-resolution effects. Such bulky designs may be impractical for near-eye see-through displays, e.g., glasses or other head-mounted see-through display devices. Further, even in cases where a see-through display device is not physically close to an eye of a user, but remains close enough that a point being viewed projects to different rays for the eyes of one or more viewers, such approaches may only attenuate light incident to the display device based on a position of the incident light on the display and may not attenuate light based on the direction of the incident light.

DETAILED DESCRIPTION

The following disclosure relates to systems and methods for performing optical image processing via a see-through display device that selectively modulates transmission of light through the device to a user's eye. The method entails, for light incident upon the see-through display device, determining the position of that incident light on the see-through display and the direction from which the light is coming, and then modulating transmission based on the determined position and direction. In other words, for one position and direction (or range of positions and directions), different modulation is used than for other position/direction combinations. For example, assume that we wish to enhance the edge of the object. For a given light ray hitting the see-through display in a particular position and at a particular angle, the position/direction determination allows that light to be modulated in a different way (e.g., enhanced) if it happens to be emanating from the edge of the object and at a direction in which it can be perceived by the viewer. Light position/direction combinations not corresponding with the object edge or outside the viewer's field of view would not be enhanced. The present description is applicable to a wide range of see-through devices such as a head-mounted see-through display device, a window in a room or a building, a car windshield, etc. As will be described in more detail below, the position/direction combinations to selectively modulate can be determined by assessing the location of viewed objects, and vantage points from which those objects are viewed.

Figure 1:
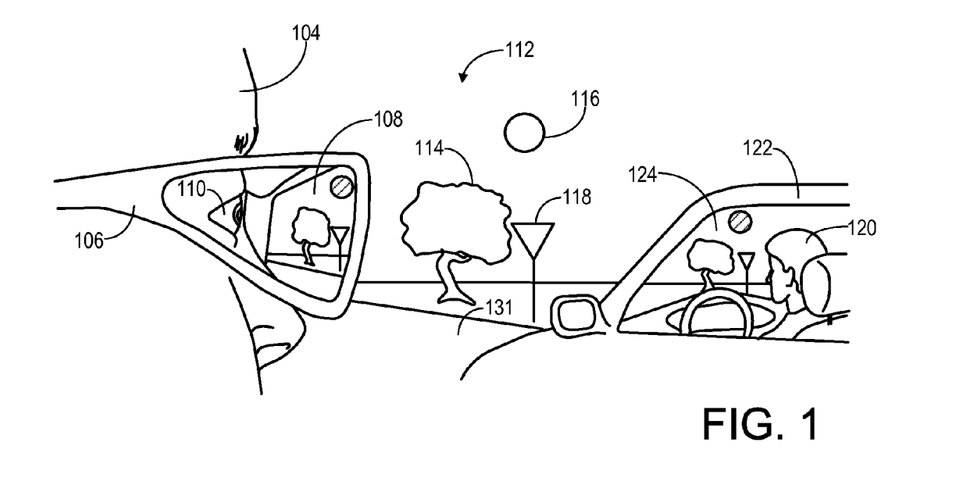
FIG. 1 shows example use cases for see-through display devices.

FIG. 1 shows example use cases for see-through display devices that selectively modulate light transmission based on determined position and direction of incident light. For example, FIG. 1 shows a user 104 wearing a head-mounted see-through display device 106, e.g., glasses, where the display device 106 includes a transparent display 108 positioned at a close physical location to an eye 110 of user 104. In FIG. 1, user 104 is shown viewing a real-world environment 112 through the transparent display 108. The transparent display is configured to modulate light from the real world scene 112 before it reaches the eye 110 of user 104. For example, transparent display 108 may be configured to selectively attenuate light transmitted therethrough by performing optical image processing on the light from the real world scene incident on the display.

As another example, FIG. 1 shows a user 120 in a vehicle 122 viewing the real world environment 112 via a transparent display 124 in the form of a windshield. The transparent display 124 may also be configured to modulate light from the real world scene 112 before it reaches the user 120. For example, transparent display 124 may be configured to selectively attenuate light transmitted therethrough by performing optical image processing on the light from the real world scene incident on the display.

By way of example, FIG. 1 shows the real world environment 112 including a road 131, a tree 114, a street sign 118, and a sun 116. It should be understood that the example transparent displays and the example real world environment shown in FIG. 1 are exemplary in nature and are not meant to be limiting in any way. For example, non-limiting examples of transparent display devices in accordance with the disclosure may take a variety of different forms including any suitable transparent device or medium through which one or more users view a scene, e.g., windows in a room or a building, car windshields, eye glasses, binoculars, visors, helmets, etc. The modulation of transmitted light can include modulating intensity, frequency, phase or any other property of the incoming light to perform various processing operations, which may include darkening subject matter (e.g., sun 116), lightening/highlighting shadows, enhancing edges, changing saturation levels, altering white balance, tone mapping, gamma correction, adjusting contrast, etc., to name a few non-limiting examples.

Optical image processing operations may be used in a variety of applications to enhance the visual performance of a human observer. For example, selective modulation may be used to adjust colors to visually separate metamers for colorblind individuals, increase visibility of objects, increase depth perception by artificially increasing contrast at silhouettes that are not obvious due to similar-color foreground and background, perform "skywriting" wherein incident light field is supplemented with text or symbolic annotations, and provide "sensor fusion" wherein additional sensor information such as night-vision, a false-color IR image, road slipperiness, etc. is superimposed on the transparent display.

Referring still to FIG. 1, the light from sun 116 provides another example of selective modulation based on determined position and direction. Specifically, light from the sun 116 may be attenuated by display devices 108 and 124 at regions of the display devices corresponding to the positions on the display device through which the light rays from the sun are transmitted to the user's eye. For example, a region on the display device 108 which intersects light rays from the sun entering the eye 110 of user 104 may be attenuated to darken the light from the sun. In one example, this is performed by a liquid crystal display (LCD) which attenuates light transmitted through all pixels in the region of the display device which intersects light rays from the sun entering the eye 110 of user 104. As described in more detail below, this attenuation may be dependent on determining a vantage point, e.g., the position of the eyes of the user relative to the transparent display or the viewed object, or the position of one or more users relative to the transparent display or the viewed object.

Figure 2:
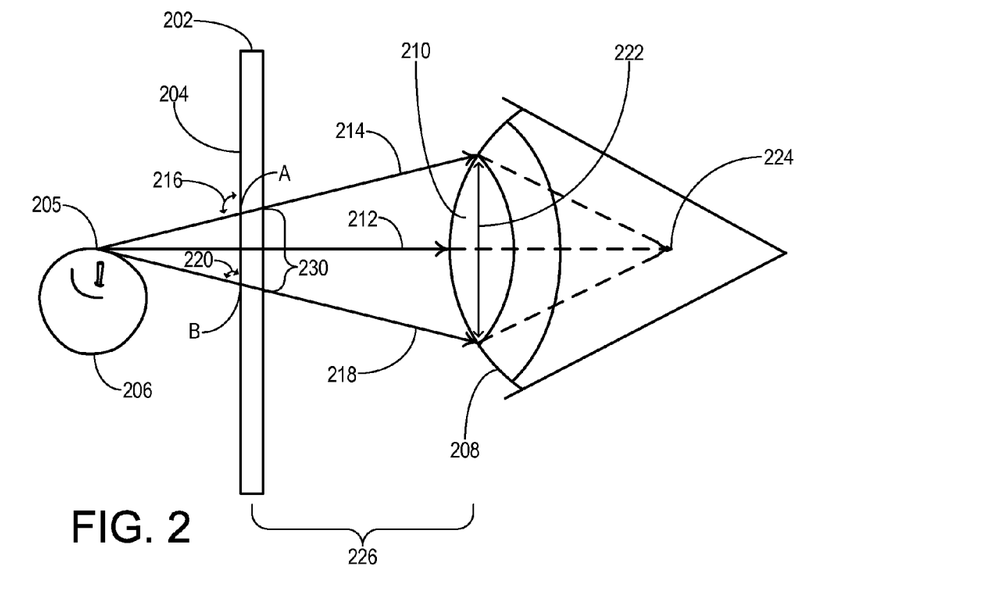
FIG. 2 shows an example transmission of light through a see-through display device at close range to a user's eye.

FIG. 2 shows an example transmission of light incident to a surface 204 of a display device 202 from a point 205 on an object 206, e.g., an apple, through the see-through display device 202 at close range to a user's eye 208. For example, display device 202 may be a lens at a distance 226 from user's eye 208 in a head-mounted display device, e.g., device 106 shown in FIG. 1. FIG. 2 shows example light rays 214, 212, and 218 emanating from point 205 at an edge of object 206 and entering the aperture of the pupil 210 of eye 208. Due to the non-zero diameter 222 of pupil 210 and the small distance 226 from the eye 208 to the display device 202, light from the point 205 on object 206 enters the pupil 210 of the eye 208 along multiple paths which are focused by the lens of the eye to a single point 224 on the retina (when the object is in focus). Since the display 202 is close to the eye 208, the light rays from point 205 on object 206 spread across a region 230 of the display, e.g., spread across multiple pixels of the display, whose extents are labeled A and B in this example.

In this example, since the light rays from point 205 on object 206 spread across a region 230 of the display, when performing optical processing associated with point 205 of object 206, it may be desirable to optically process all the light rays passing through region 230. For example, performing optical processing only on the light ray 212 directly entering the eye 208, e.g., at a pixel where light ray 212 intersects the display 202, would leave other light rays outside of that pixel on the display, e.g. light rays 214 and 218, unprocessed. For example, if the image processing operation performed includes darkening a silhouette or outline of object 206, and only light ray 212 is attenuated to darken light from point 205, then the shape formed by darkening pixels so near to the eye may be out of focus and will not fully darken the perceived edge of the object.

In order to enable high-resolution image processing for a display close to an eye of a user, the light transmitted through display device 202 may be modulated not only spatially (i.e., by position on the see-through display), but also directionally (e.g., based on angle of incidence). For example, the processing for the light rays emanating from point 205 on object 206 entering eye 208 may be performed across the range 230 of display 202. Further, each light ray emanating from point 205 and entering pupil 210 may be modulated differently depending on the angle that each light ray intersects display 202 and each location or pixel on display device 101 may modulate incoming light differently for light rays incident to that pixel with different angles of incidence (i.e., different directions). For example, a light ray incident to display device 202 at point A with an angle of incidence different than the angle of incidence 216 of light ray 214 (e.g., a light ray which does not enter pupil 210) may be modulated differently than light ray 214 which is incident to display device 202 at position A at angle 216. As another example, a light ray incident to display device 202 at point B with an angle of incidence different from the angle of incidence 220 of light ray 218 may be modulated differently than light ray 218 which is incident to display device 202 at position B at angle 220.

Further, the range 230 of the display device spanned by light rays from point 205 may depend on the distance 226 of the eye 208 from the display device. For example, as the distance 226 increases, the range 230 decreases so that for display devices which are farther from the eyes of a user modulation adjustments based on the pupil size may not be needed. However, selective modulation of light transmitted through a display device based on position and direction of light from an object being viewed through a transparent display device may also enable high-resolution optical image processing in situations where the display is not close to the eye, but remains close enough that a point being viewed projects to different rays for the different eyes of a user.

Figure 3:
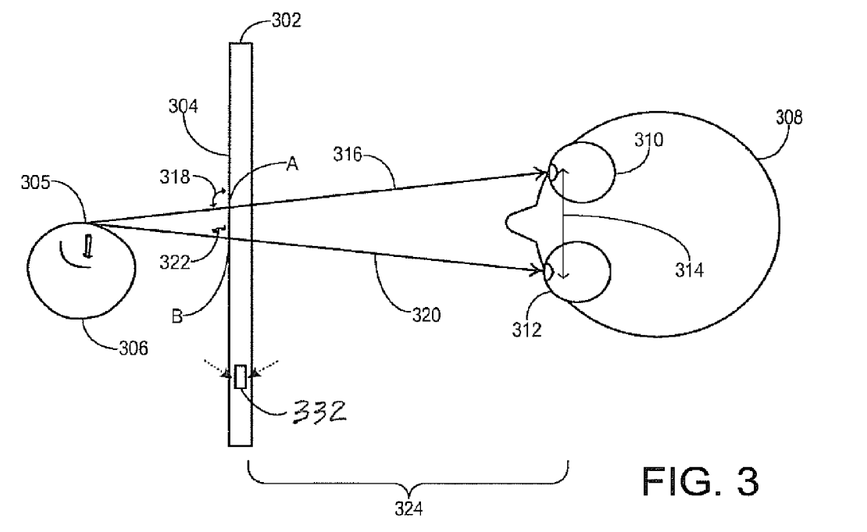
FIG. 3 shows an example transmission of light through a see-through display device to eyes of a user.
Figure 4:
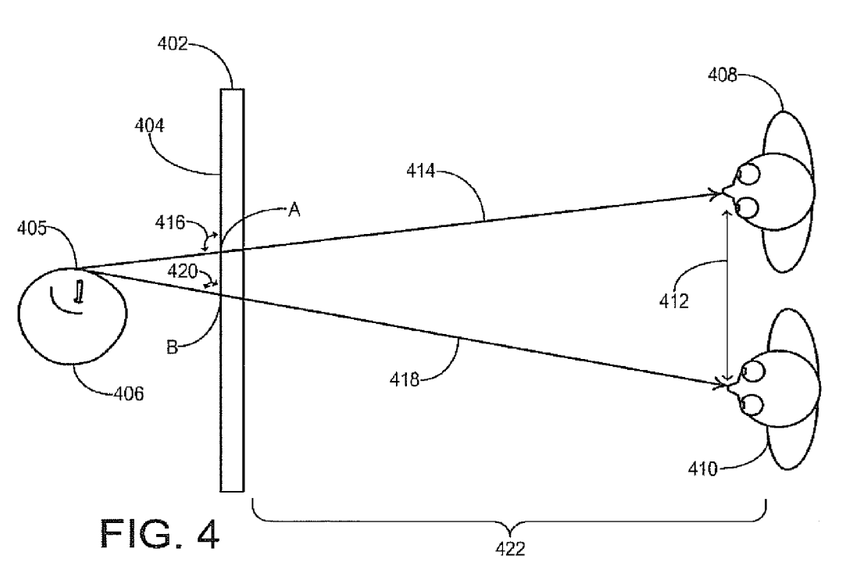
FIG. 4 shows an example transmission of light through a see-through display device to two different users.

FIGS. 3 and 4 provide further examples of selective modulation based on position and direction, and show how the modulation can vary depending on the position of viewed objects and the position of vantage points from which those objects are viewed. Referring first to FIG. 3, the figurer shows a user 308 viewing an object 306 through a see-through display device 302. In this example, the user is at a distance 324 from the display device 302 such that, due to the distance 314 between the user's eyes 310 and 312, light rays from a point 305 on object 306 enter the different eyes of the user along different directions. For example, light ray 316 from a point 305 on object 306 is incident to surface 304 of display device 302 and intersects display device 302 at a point A and at an angle of incidence 318 to enter eye 310 and light ray 320 from the point 305 on object 306 intersects display device 302 at a point B and at an angle of incidence 322 to enter eye 312. In this example, modulation of light from the point 305 on object 306 may be performed for both light rays 316 and 320 depending on the location and direction that the light rays intersect the display device 302 to enter the different eyes of the user. For example, if an attenuation is performed to highlight an edge of object 306 then light may be attenuated for light incident at point A with angle 318 and light incident at point B with angle 322 whereas light entering point A with an angle different from angle 318 may be attenuated differently than the attenuation applied to light ray 316 and light entering point B with an angle different from angle 322 may be attenuated differently than the attenuation applied to light ray 320.

For example, a point on the sign 118 being highlighted by the car windshield 124 shown in FIG. 1 may correspond to slightly different points on the windshield when viewed by the left and right eyes of the driver 120. Thus, light may be selectively modulated at different points on the windshield 124 so that the attenuation for the different rays viewed by each eyeball of the driver 120 are customized. Further, mid-range optical processing scenarios such as shown in FIG. 3, e.g., car windshields, building windows, etc., may not need to process the full light field of an entire real-world scene but instead may only perform optical processing on a portion of the real-world scene being viewed by the user. In some examples, such systems may track the eyes of a user to determine locations of a user's eyes and only compute and manipulate the light rays corresponding to each eye's view.

From the above, it will be appreciated that that the desired modulation may vary depending on the vantage point from which an object is being viewed. In the example of FIG. 3, each eye has a different vantage point, and at some level, different parts of the eye have different vantage points. Similarly, it typically will be desirable to vary modulation depending on the position of the viewed object 306. The positions of the viewed object and vantage point will dictate the position(s)/direction(s) of light on the see-through display device that should be modulated differently. Accordingly, determining the position/direction combinations to modulate may include one or both of determining the position of a vantage point and the position of a viewed object.

To determine positions of vantage points and viewed objects, a see-through display device may also include a camera 332. "Camera" broadly refers to any sensing mechanism for determining position of viewed objects and vantage points. Camera implementations may include time-of-flight, structured light, depth-based methods, machine vision, object recognition, internal models of objects in the viewed scene, multiple cameras, depth sensors, etc., in order to provide an estimation of the position of a viewed object or vantage point. These are but a few non-limiting examples. Accuracy may be improved in some examples by estimating the depth, or disparity of the incoming light between the camera and the see-through display, if they are not co-located. With respect to a user's eyes, determining vantage point location may include tracking movement of the user's eyes (e.g., gaze detection).

Different vantage points also arise when more than one viewer is looking through the see-through display device, for example two passengers looking through a windshield, or multiple viewers looking through a building window. FIG. 4 shows such a situation. Specifically, a first user 408 and a second user 410 are at different positions, e.g., with a distance 412 between the users and a distance 422 to see-through display device 402 through which the users are viewing an object 406. In this example, light from a point 405 on object 406 is transmitted by different light rays with different directions and at different locations on display device 402. For example, user 408 views point 405 on object 406 via light ray 414 which intersects display device 402 at point A with an angle of incidence 416 with surface 404 of display 402 and user 410 views point 405 on object 406 via light ray 418 which intersects display device 402 at point B with an angle of incidence 416 with surface 404 of display 402.

In this example, modulation of light from the point 405 on object 406 may be performed for both light rays 414 and 418 depending on the position and direction that the light rays intersect the display device 402 to reach the different users. For example, if an attenuation is performed to highlight an edge of object 406 then light may be attenuated for light incident at point A with angle 416 and light incident at point B with angle 420 whereas light entering point A with an angle different from angle 416 may be attenuated differently than the attenuation applied to light ray 414 and light entering point B with an angle different from angle 420 may be attenuated differently than the attenuation applied to light ray 418.

For example, a point on the sign 118 being highlighted by the car windshield 124 shown in FIG. 1 may correspond to slightly different points on the windshield when viewed by the driver 120 and a passenger in the vehicle. Thus, light may be selectively modulated at different points on the windshield 124 so that the modulation for the different rays viewed by the driver and the passenger are customized. Similarly, building denizens gazing through architectural windows may see a given point outside along very different rays, thus modulation of the given point may be performed at different locations on the window for each viewer of the given point depending on the location and view of each user.

Further, as discussed above, mid-range optical processing scenarios such as shown in FIG. 4, e.g., car windshields, building windows, etc., may not need to process the full light field of an entire real-world scene but instead may only perform optical processing on a portion of the real-world scene being viewed by the users. In some examples, such systems may track the positions of the users to determine locations of the users relative to the display device and only compute and manipulate the light rays corresponding to each user's view. As in the example of FIG. 3, one or more cameras may be used to track use vantage points. As another example, regions on the display device which are processed to modulate light may be based on predetermined vantage point information, e.g., based on typical locations of users relative to the display device. For example, in vehicle windshield applications, locations of the driver and passenger may be generally known and modulation may be applied to light transmitted through the windshield of the vehicle based on these predetermined positions. As another example, if the display device is a window of a room, attenuation may be applied to regions of the window corresponding to typical viewpoints of occupants in the room, e.g., to dim sunlight reaching occupants of the room.

Figure 5:
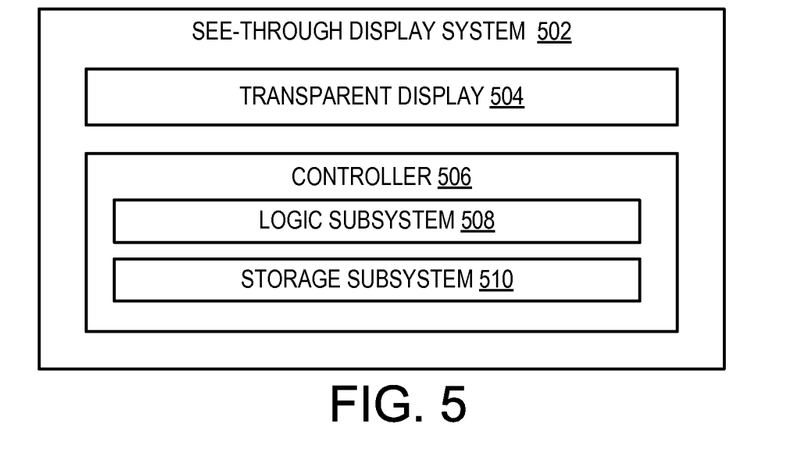
FIG. 5 shows an example see-through display system in accordance with the disclosure.

FIG. 5 shows an example see-through display system 502 which may be used to selectively modulate light transmitted through a see-through display device based on position and direction of light incident on the display device. See-through display system 502 includes a transparent display 504 and a controller 506 including a logic subsystem 508 and a storage subsystem 510. The controller may be configured to determine position and direction of light on transparent display (e.g., with a camera) and then modulate transmission through the transparent display based on the determined position and direction. Storage system 510 may include instructions executable by logic subsystem 508 to perform position/direction determinations and control modulation operations performed at transparent display 504. The system of FIG. 5 may be adapted to carry out and of the examples herein, and further may be implemented to carry out the below-described example method of FIG. 7.

The see-through display system 502 is configured to modulate transmission of incident light rays, typically through optical or electro-optical means. The see-through display system 502 may appear in a transparent state, through which real-world scenes can be viewed with minimal distortion (similar to eyeglasses, a windshield, or a window, for example). In addition, as discussed throughout this description, the see-through display system 502 is controllable to selectively modulate light transmitted to a viewer (e.g., to enhance contrast, highlight edges, etc.). Controller 506 is configured to perform real-time modulation on light rays transmitted through the transparent display 504 so that modulation acts immediately on the incident light and the processed real-world scene can be observed with minimal latency.

Transparent display 504 may include any suitable controllable see-through medium and may be composed of any suitable material. For example, transparent display 504 may be a thin device with high transmissivity, appearing similar to a conventional sheet of glass. In some examples, the transparent display may comprise one or more liquid-crystal displays (LCDs). As another example, transparent display may comprise a lenslet array and one or more LCDs, lenticular sheets and one or more LCDs, a parallax barrier and one or more LCDs, or combinations thereof.

The transparent display 504 may use conventional methods for light field display, including integral imaging (e.g., lenslet arrays and lenticular sheets) and parallax barriers. Such displays may consist of a conventional spatial light modulator (SLM), e.g., a liquid crystal display (LCD), in combination with one or more additional layers to achieve modulation (e.g., a light-refracting or light-attenuating layer). For example, a lenslet-based transparent display may be created by affixing a refractive lenslet array to an SLM. As an example, an incident ray would impinge on the lenslet array, ultimately intersecting a pixel on the underlying SLM. This pixel could vary its opacity to modulate this ray. If a mirror was placed behind the SLM, then this ray would emerge with the appropriate attenuate at the same position and in the same direction, thus implementing a light field modulating mirror. Alternatively, a second lenslet array and/or additional optical elements could be placed behind the SLM to allow this modulated ray to continue to propagate along its original trajectory, albeit with an attenuated radiance.

Similar embodiments are possible by substituting SLMs for the lenslet arrays. For example, a pair of SLMs (e.g., two LCDs), separated by a small gap, can function as a light field modulating transparent display. For example, one SLM may be configured to display a pinhole array, consisting of a grid of transparent pixels on an opaque background and the other SLM may include regions behind each pinhole which permit angular control of the attenuation, directly implementing a low-resolution, anisotropic attenuator. A two-layer SLM may be generalized to stacks of three or more SLMs, allowing for finer-scale control of the spatio-angular attenuation. The two-dimensional, isotropic attenuation patterns implemented by each SLM can be computationally optimized to approximate any arbitrary 4D light field attenuation profile. The SLMs may be refreshed at a rate faster than can be perceived by the human eye, allowing greater degrees of freedom to achieve fine-scaled spatio-angular control of the modulated light field.

By combining light field modulators with light field displays, additional applications are enabled. For example, using only a light field modulator, dark text can be superimposed on a bright sky. However, light field modulators may not be able to superimpose bright text on a dark background. By incorporating a light field display between the entrance and exit apertures, such applications may be enabled.

Figure 6:
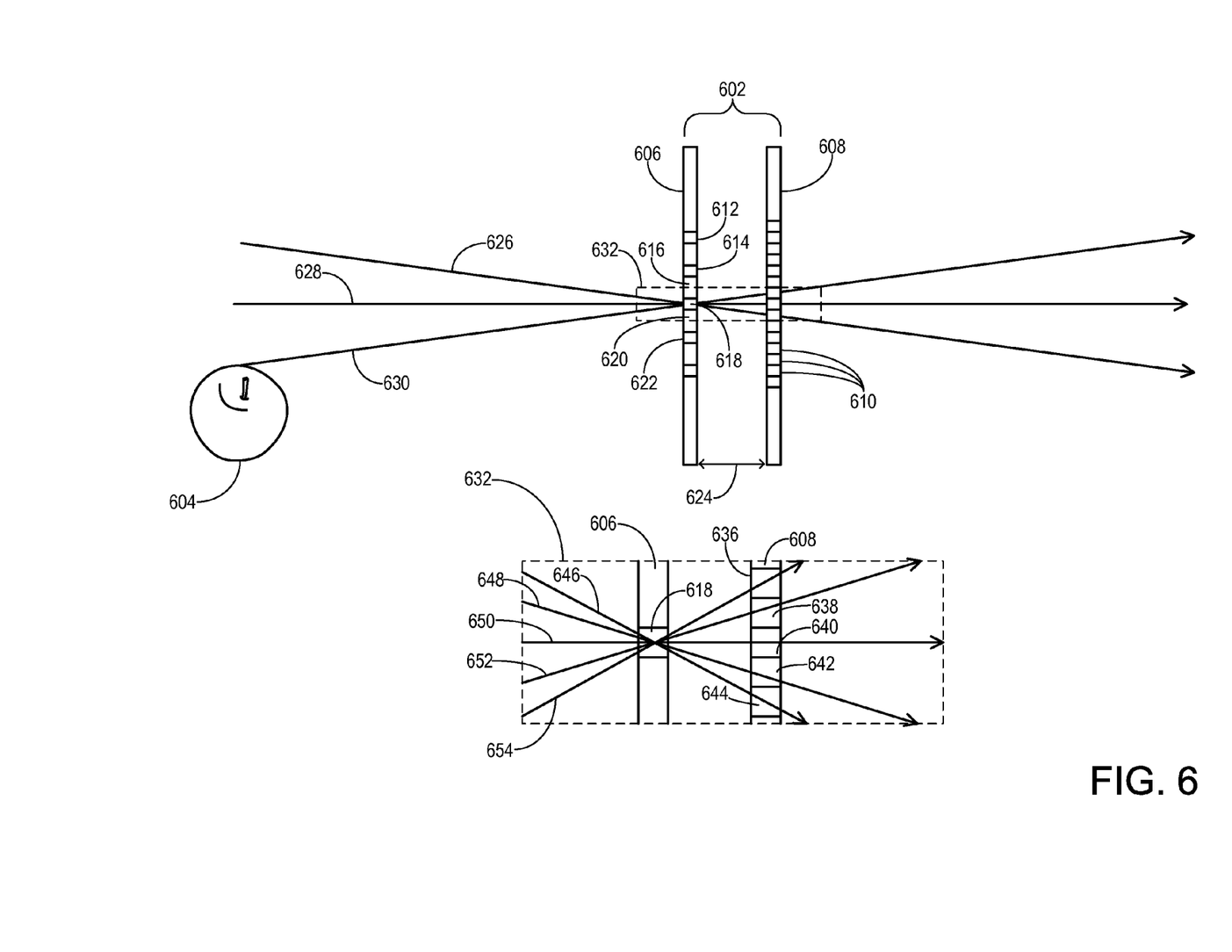
FIG. 6 shows an example transparent display of a see-through display system in accordance with the disclosure.

FIG. 6 shows an example transparent display 602 of a see-through display system, e.g., see through display system 502. Transparent display 602 comprises at least a first layer 606 and a second layer 608 separated by a gap 624. For example, the first layer 606 may comprise a lenslet array, a pin-hole array, an LCD panel or any other suitable substrate through which incident light is selectively directed to second layer 608 based on an angle of incidence of the incident light and a location on first layer 606 at which the light is incident. Second layer 608 may comprise an LCD panel or any other suitable substrate which is configured to attenuate or otherwise modulate light incident to the second layer. For example, second layer 608 may be configured to multiplicatively attenuate light incident upon the second layer. Though FIG. 6 shows only two layers, in other examples, transparent display 602 may comprise more than two layers, e.g., multiple LCD panels separated by gaps, a pinhole array coupled to two or more LCD panels, a lenslet array with an SLM, etc.

First layer 606 includes a plurality of transmissive regions, e.g., regions 612, 614, 618, and 622, through which incoming light may be transmitted. For example, the transmissive regions may comprise pinholes, lenslets, or any other suitable regions which permit light to pass therethrough. The transmissive regions may be separated by non-transmissive regions, e.g., regions 616 and 620, through which the transmission of light is impeded. For example, first layer 606 may be an array of pinholes, a lenslet array, or an LCD configured to substantially prevent light from being transmitted through the non-transmissive regions while permitting light to be transmitted through the transmissive regions.

The second layer may comprise a plurality of pixels 610. For example, second layer may comprise an LCD with a plurality of pixels 610 where each pixel is configured to modulate light incident to the pixel. For example, second layer 608 may be configured to adjust a frequency and/or an intensity of light incident on a pixel in second layer 608. Light rays incident to the surface of first layer 606 are transmitted through the transmissive regions in first layer 606 to pixels in second layer 608 associated with the transmissive regions. In particular, each transmissive region in first layer 606 may have a group of pixels on second layer 608 associated with it so that light entering the transmissive region is directed to a pixel in the group of pixels associated with the transmissive region based on an angle of incidence of the light.

For example, FIG. 6 shows light rays 630, 628, and 626 incident at transmissive region 618 on first layer 606 at different angles. For example, light ray 630 may emanate from a point on an object 604 being viewed by a user whereas light rays 628 and 626 may emanate from other locations in a real world scene. The light rays entering transmissive region 618 are directed to a corresponding region of pixels, indicated in box 632 which is shown in an exploded view in FIG. 6, based on an angle of incidence of each light ray at the transmissive region 618. For example, as shown in the exploded view 632, light ray 646 passing through transmissive region 618 is directed to pixel 644, light ray 648 is directed to pixel 642, light ray 650 is directed to pixel 640, light ray 652 is directed to pixel 638, and light ray 654 is directed to pixel 636. Thus, by passing through transmissive region 618, light rays with different angles are directed to different pixels of second layer 608 so that light rays with different angles of incidence on display 602 may be modulated differently based on the angle of incidence.

Figure 7:
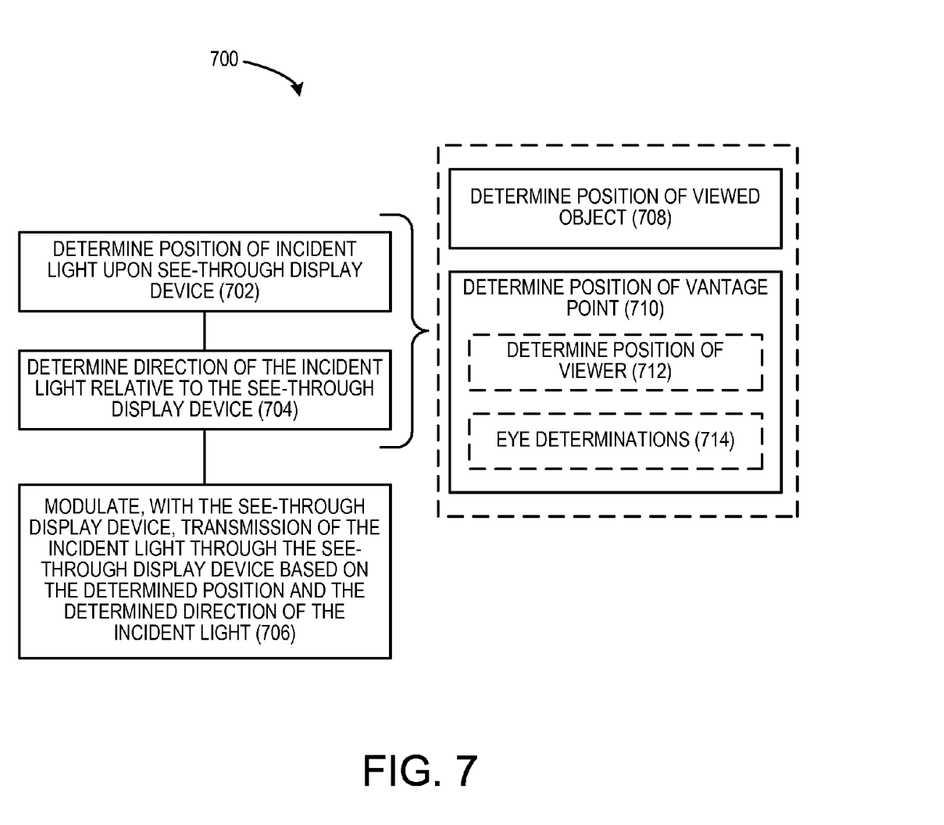
FIG. 7 shows an example method for modulating a transmission of incident light through a see-through display device in accordance with the disclosure.

Turning now to FIG. 7, the figure shows an example method 700 for optically processing light incident upon a see-through display device, such as the see-through display devices described in various of the other figures. More specifically, method 700 is implemented to modulate transmission of light through a see-through display device based on determined position and direction of incident light.

At 702, the method includes determining the position of incident light upon a see-through display device. At 704, the method includes determining the direction of the incident light relative to the see-through display device. At 706, transmission of the incident light (i.e., transmission to a viewer) is modulated based on the determined position and direction of the incident light.

Determining the position and the direction of the light to be selectively modulated (i.e., steps 702 and 704) may be performed in various ways. For example, these determinations may be made by determining the position of a viewed object, as shown at 708. In addition, the determinations may be made by determining the position of a vantage point, as shown at 710. As shown at 712 and 714, determining vantage point positions can include determine the position of a viewer (or viewers, e.g., passengers in a vehicle), and/or making determinations about a viewer's eyes (e.g., eye positions, movements of the eye, etc.) As described above with reference to FIGS. 3 and 4, the position and direction determinations of steps 702, 704, 708, 710, 712 and 714 may be performed using a camera, for example a camera system using structured light, time-of-flight, depth methods, etc. Still further, a conventional digital visible-light camera or stereo camera pair. When using a stereo camera pair, the cameras may be used to estimate object depth.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware including the specific examples described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method of optically processing light incident upon a see-through display device, the method comprising:
   determining a position of incident light upon the see-through display device;
   determining directions of light rays in the incident light relative to the see-through display device, wherein the directions are different among the light rays in the incident light; and
   optically modulating, with the see-through display device, a property of the incident light transmitted through the see-through display device based on the determined position and determined directions of the light rays in the incident light, wherein the see-through display device comprises:
   a first layer comprising a plurality of transmissivity regions separated by non-transmissive regions; and
   a second layer spaced apart from the first layer and comprising a plurality of pixels,
   wherein the optically modulating comprises: a respective transmissive region of the first layer directing light rays of multiple incident angles from the respective transmissive region to multiple pixels of the second layer; and the multiple pixels attenuating the light rays of the multiple incident angles.

2. The method of claim 1, wherein the determining the position of the incident light and the determining the directions of the light rays in the incident light are performed using a camera.

3. The method of claim 2, wherein the determining the position of the incident light and the determining the directions of the light rays in the incident light comprise using the camera to determine a position of a viewed object.

4. The method of claim 2, wherein the determining the position of the incident light and the determining the directions of the light rays in the incident light comprise using the camera to determine a position of a vantage point.

5. The method of claim 1, wherein the determining the position of the incident light and the determining the directions of the light rays in the incident light comprise determining a position of a viewed object.

6. The method of claim 1, wherein the determining the position of the incident light and the determining the directions of the light rays in the incident light comprise determining a position of a vantage point.

7. The method of claim 6, wherein the determining the position of the vantage point comprises determining one of an eye position and an eye movement of a viewer.

8. The method of claim 6, wherein the determining the position of the vantage point comprises determining a position of a viewer.

9. The method of claim 1, wherein the optically modulating the property of the incident light is performed by using one or more liquid crystal display layers.

10. The method of claim 1, wherein the first layer comprises a microlens array and the second layer comprises a spatial light modulator.

11. The method of claim 1, wherein the optically modulating the property of the incident light further comprises modulating one of a frequency and an intensity of the incident light.

12. A method of optically processing light incident upon a see-through display device, the method comprising:

determining a position of incident light upon the see-through display device;

determining directions of light rays in the incident light relative to the see-through display device, wherein the directions are different among the light rays, wherein the determinings comprises (i) determining a position of a viewed object, and (ii) determining a position of a vantage point; and optically modulating, with the see-through display device, a property of the incident light transmitted through the see-through display device based on a determined position of the incident light and determined directions of the light rays in the incident light, wherein the optically modulating comprises attenuating the light rays differently according to respective determined directions of the light rays, wherein the see-through display device comprises:

a first layer comprising a plurality of transmissivity regions separated by non-transmissive regions; and a second layer spaced apart from the first layer and comprising a plurality of pixels, wherein the optically modulating comprises: a respective transmissive region of the first layer directing light rays of multiple incident angles from the respective transmissive region to multiple pixels of the second layer; and the multiple pixels attenuating the light rays of the multiple incident angles.

13. The method of claim 12, wherein the determining the position of the viewed object and the determining the position of the vantage point are performed by using a camera.

14. A see-through display system, comprising:

a transparent display comprising: a first layer comprising a plurality of transmissivity regions separated by non-transmissive regions; and a second layer spaced apart from the first layer and comprising a plurality of pixels; and a controller configured to:

determine a position of incident light upon the transparent display; determine direction of light rays in the incident light upon the transparent display, wherein the directions are different among the light rays in the incident light; and control optical modulation via the transparent display of a property of the incident light transmitted through the transparent display based on determined position and determined directions of the incident light, wherein a respective transmissive region of the first layer is configured to direct light rays of multiple incident angles from the respective transmissive region to multiple pixels of the second layer; and the multiple pixels are configured to attenuate the light rays of the multiple incident angles.

15. The see-through display system of claim 14, further comprising a camera, wherein the controller is further configured to determine the position of the incident light and determine directions of the light rays in the incident light by using output from the camera.

16. The see-through display system of claim 15, wherein the controller is configured to determine the position of the incident light and determine the directions of the light rays in the incident light by determining a position of a viewed object by using output from the camera.

17. The see-through display system of claim 15, wherein the controller is configured to determine the position of the incident light and determine the direction of the light rays in the incident light by determining a position of a vantage point by using output from the camera.

18. The see-through display system of claim 14, wherein the controller is configured to determine the position of the incident light and determine the directions of the light rays in the incident light by determining a position of a viewed object.

19. The see-through display system of claim 14, wherein the controller is configured to determine the position of the incident light and determine the directions of the light rays of the incident light by determining a position of a vantage point.

20. The see-through display system of claim 14, wherein the property of the incident light is one of frequency, phase and intensity of the incident light.

21. The see-through display system of claim 14, wherein the first layer comprises a lenslet array and the second layer comprises a liquid-crystal display (LCD).

22. The see-through display system of claim 14, wherein said transparent display comprises an anisotropic attenuator that comprises a pinhole array.

* * * * *